Dec. 27, 1938.   O. WOLF ET AL   2,141,633
HEATER FOR FLUIDS
Filed July 6, 1935   2 Sheets-Sheet 1

Oscar Wolf
R. C. Powell
INVENTOR
BY R. J. Dearborn
their ATTORNEY

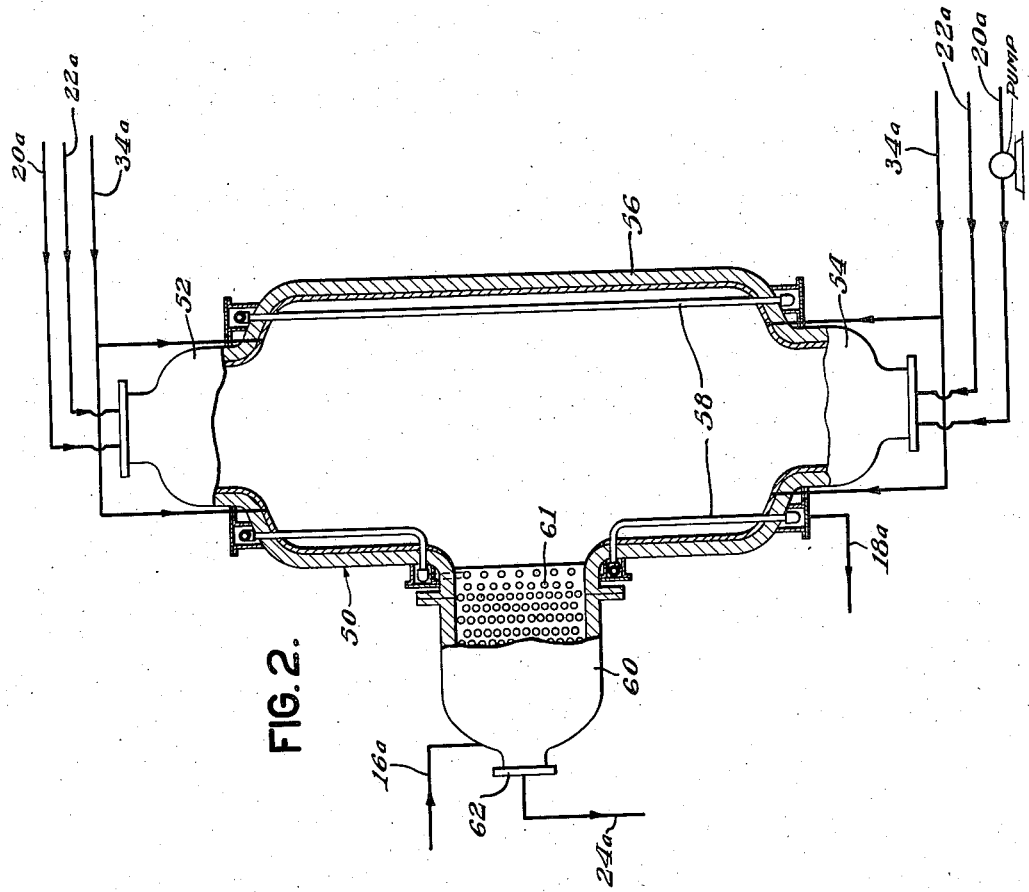

Patented Dec. 27, 1938

2,141,633

UNITED STATES PATENT OFFICE 2,141,633

HEATER FOR FLUIDS

Oscar Wolf and Ross C. Powell, Forest Hills, N. Y., assignors to The Texas Company, New York, N. Y., a corporation of Delaware Application July 6, 1935, Serial No. 30,123

4 Claims. (Cl. 196—116)

This invention relates to a new type furnace and heater for heating hydrocarbon materials, such as crude oil or petroleum distillate, to temperatures upward of 800° F.

It is a primary object of the invention to provide a heater which will have a higher efficiency in operation and be of smaller proportions for the same heat transfer capacity than those heretofore available.

The greater efficiency in operation is attained in part by maintaining a substantial positive pressure in the combustion and heat absorption sections of the furnace and by recirculating a portion of the exhaust gases under pressure with the new products of combustion passing the heat absorption tubes so as to equalize the heat absorption in the radiant and convection sections of the heater.

The invention will be fully understood from the following description when considered in connection with the drawings, in which,—

Fig. 2 illustrates a modified form of furnace and heater.

Figure 1:
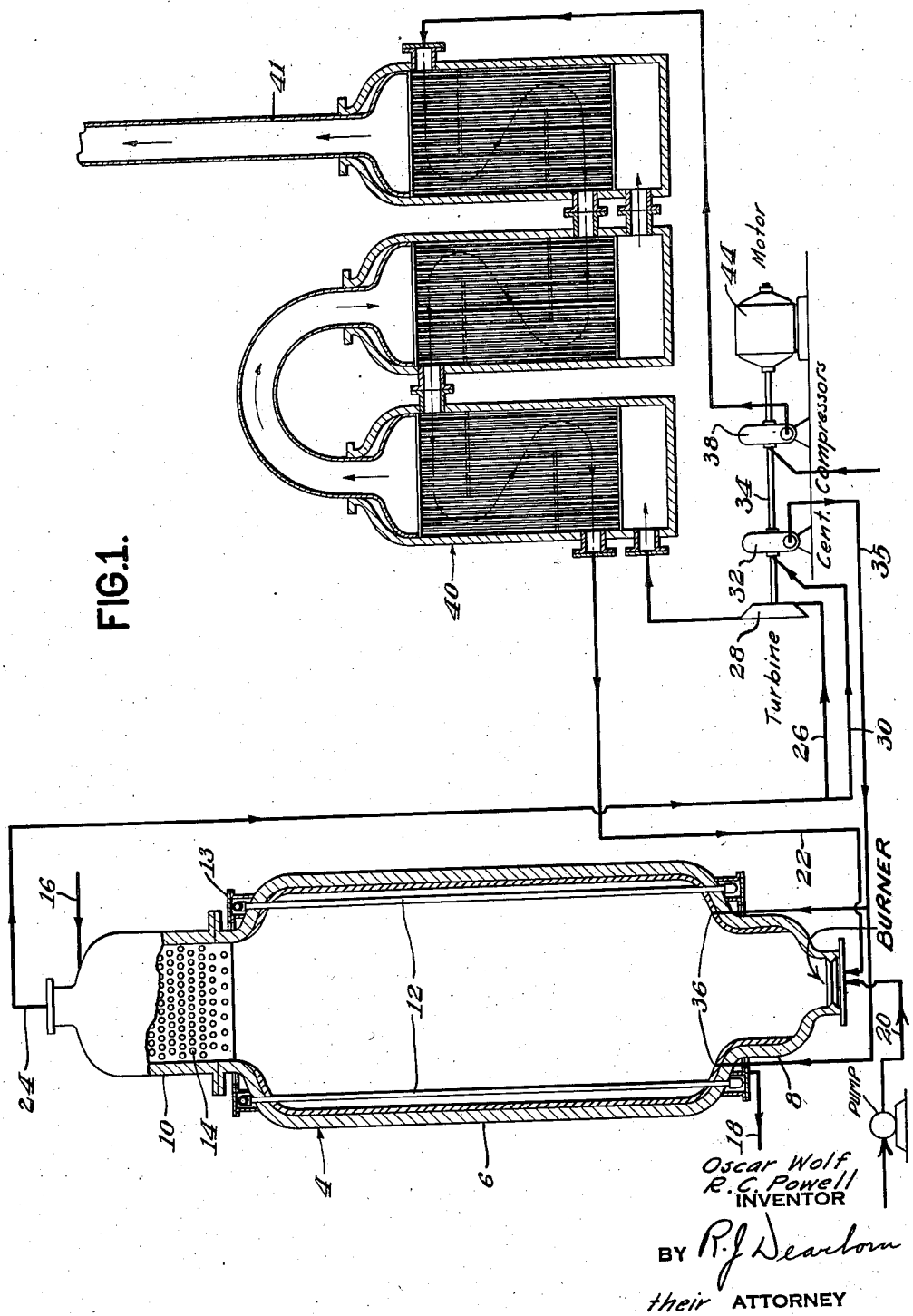
Fig. 1 illustrates the essential features of one form which the present invention may assume.

The heater includes a vessel 4 of general cylindrical or rectangular cross section and having an enlarged central section 6 constituting the radiant heat absorption section, a reduced section 8 at one end, constituting a combustion section and a reduced section 10 at the opposite end constituting the convection heat absorption section.

The section 6 is preferably formed with a single bank of closely spaced tubes 12 encircling the same, the tubes 12 preferably extending through the furnace walls and being connected by return bends placed outside the furnace chambers. The ends of the tubes are enclosed within channels 13 secured to the furnace walls. This construction is not essential but is preferred so that the interior of the furnace may be sealed, with the tubes 12 loosely mounted in the openings in the furnace wall, permitting independent contraction and expansion of the tubes and furnace walls. In the particular construction disclosed herein the radiant section is provided with 40 to 50 closely spaced tubes, 4½ inches in diameter and 20 feet long, exposed for their entire length and spaced inwardly from the furnace wall.

The tubes 14 in the convection section 10 are closely spaced and occupy a major portion of the entire volume of the section. As shown, there are approximately thirteen parallel rows of tubes, each tube having a diameter of 4½ inches with a clearance of one-half inch between the pipes. With a convection section having a cross sectional area of approximately 25 square feet, this will afford slightly less than 1000 square feet of pipe surface exposed to the heated gases. Since the front rows of pipes in the convection section will be exposed to the radiant heat of the burner, it is preferred to space the first few rows of pipes to a greater extent than in the main bank of pipes 14 in the section. This forms a shield section subjected to lower mass velocities of the passing gases to compensate for the direct furnace radiation received by these exposed pipes.

The tubes in the convection section are positioned closely together for the dual purpose of obstructing the flow of gases, for maintaining in the furnace the desired pressure, and for the further purpose of providing a high mass velocity of gases contacting the convection tubes for achieving a greatly increased heat transfer rate from the combustion gases to the material passing through the tubes.

It will be understood that the arrangement, size and form of the tubes in the radiant and convection sections will be selected in accordance with the particular installation being made and that wide variations in these respects are permissible. In the present adaptation of the invention the charge is introduced into the furnace in the convection section as indicated at 16, passing in series through the tubes in the convection section, then through the tubes in the radiant section, being finally discharged as indicated at 18.

The burner for supplying fuel and air to the combustion section 8 of the furnace may be of any desired type (not shown). The fuel supply 20 and air supply 22 are maintained under substantial pressure, corresponding to the pressure desired to be maintained in the furnace, as indicated below.

The gas stream passing from the convection section of the furnace is divided in such a proportion that an amount of gas corresponding to the fuel gas plus combustion air is directed to a gas turbine while a portion of the gases are recirculated through the furnace with the ignited gases from the burner. The compressed heated gases discharged from the heater constitute a satisfactory source of power for compressing the recirculation gases and also for compressing the new combustion promoting air introduced under pressure into the furnace. The turbine can also be utilized for compressing the fuel although in most instances the fuel is supplied to the burner under such initial pressure that further compression is unnecessary.

The gas stream discharged from the convection section of the heater at 24 is accordingly divided, a portion going through the conduit 26 to the gas turbine 28 and a portion through the pipe 30 to the compressor 32. The turbine 28 may be of any standard construction utilizing the compressed heated exhaust gases and serving to drive the power shaft 34 at a predetermined speed. The compressor 32 may also be of any standard construction although a centrifugal compressor is preferred due to the large volume of gases which the compressor must accommodate. The gases compressed at 32 are passed through the conduit 35 into the heater at suitable points indicated at 36, the gases being thereby recirculated through the entire heat absorption section of the furnace with the new products of combustion produced at the burner.

In order to withdraw as much as possible of the sensible heat from the discharged gases, these gases are passed through a heat exchanger 40 before being discharged through the stack 41. The air supplied to the furnace at 22 is compressed by a compressor 38 which forces the compressed air through the heat exchanger 40 countercurrent to the flow of exhaust gases, the heated air being conducted to the burner through the lines 22.

The shaft 34 may be operated initially or in emergency by the motor 44, this motor being automatically disconnected from the shaft in the normal operation of the furnace after temperatures and pressures have been reached.

In the modified form of the apparatus the principle involved in the construction is the same except that a double ended heater is employed wherein fuel is introduced at both ends of the vessel and discharged on one or more sides adjacent the central portion of the vessel. This is illustrated in Fig. 2 wherein the vessel 50 is formed with two combustion sections 52 and 54 to be provided with the usual burners (not shown) for receiving fuel and air injected into the vessel under pressure. The central section 56 of the vessel is provided with tubes 58, preferably placed in a single row around the interior of the vessel and extending for the entire length thereof except at the entrance to the convection section 60 leading to the outlet 62. This section is filled with closely spaced tubes 61 between which the hot gases pass as in the first form of the invention.

The charge to be heated in the tubular furnace is introduced into the tubes in the convection section as indicated at 16a, the charge passing from the convection section to and through the tubes 58 comprising the radiant section and out through the passage 18a. It is preferred to pass the charge in series through the entire set of tubes in the convection section and then in the radiant section although it will be understood that the heater may be made sufficiently large that the tubes may be divided to provide two or more parallel passages for the material being heated. This latter construction would be particularly desirable in case two duplicate sections 60 and discharge passages 62 are employed, on opposite sides of the central portion of the furnace. The remaining elements of the system, including the gas turbine, compressors, preheat apparatus for the air, etc., connected with the corresponding conduits 20a, 22a, 24a and 34a, will be the same as in the first form of the invention so that it is unnecessary to duplicate these features of construction in Fig. 2.

In the normal operation of the system, assuming a desired temperature of approximately 900° F. in the gas stream passing from the convection section, it is contemplated to maintain in the combustion space of the vessel 4 a pressure of from 25 to 35 pounds per square inch absolute although the system can be operated with any pressure substantially above atmospheric, for example, 15 pounds per square inch absolute up to 50 pounds per square inch absolute.

The flue gases after passing through the turbine will have dropped to a temperature of from 600° to 650° F. and will be only slightly above atmospheric pressure, for example, 14.8 to 17 pounds absolute. This temperature is sufficient to obtain an appreciable air preheat in the heater 40 which serves to reduce the gases to a stack temperature of about 300° F. and to preheat the incoming air to about 500° F.

The preferred pressure to be maintained in the interior of the furnace is from 28 to 30 pounds absolute. This requires a relatively heavy walled furnace, carefully jacketed so that no leaks occur where the tubes pass through the walls of the furnace, for example. The interior of the furnace should be lined with a relatively heavy insulating material to protect the metal walls and the exterior surface adequately insulated to prevent undue loss of heat.

It has been found that the absorption of heat in the radiant section can be reduced to a quantity such that a substantially equal number of heat units are absorbed in the radiant and convection sections of the furnace by recirculating a portion of the exhaust gases through the heater. It is sufficient to recirculate from 10% to 50% of the exhaust gases, approximately 30% being preferred for most operations. These exhaust gases serve to limit the heat absorption in the radiant tubes and to forward additional heat units for absorption in the convection section. Since the flue gas is recirculated substantially at its discharge temperature of 900° F., there is little ultimate heat loss in recirculating these gases through the furnace, assuming all conduits to be properly jacketed.

The construction disclosed herein is based upon a flow of combustion gases of the order of 16 pounds per second. There is a free area between the tubes in the convection section disclosed of approximately 2 square feet, giving a mass velocity in the convection section of about 8 pounds, per square foot, per second. A mass velocity of from 4 to 6 pounds is readily attainable with a construction of the type disclosed. These values are considerably higher than are attainable with the usual type heater and materially increase the heat absorption in the convection section.

With the furnace described herein a greater overall efficiency is attainable than with the present conventional furnace design operating at low pressure. The cost of construction, particularly in the convection section, is substantially less since a relatively smaller tube surface is required, due to the high mass velocity adjacent the tubes. The heater is smaller than a standard construction, for the same heat liberation, due to the higher density of the combustion air and gases at the furnace pressures employed. Furthermore, there is improved combustion and more rapid combustion reactions at these high furnace pressures, with a higher state of turbulence and shorter flame length. The danger of direct flame impingement on the tubes in the radiant section is practically avoided. Due to the positive control of all of the elements affecting combustion conditions in the furnace, including the recirculation of a portion of the exhaust gases, there is an increased operating flexibility adapting the construction to various requirements with a minimum of structural change.

It will be understood that suitable valves and other controls are provided for the various units and conduits of the apparatus in order to attain the desired operation, including temperatures and pressures throughout the system.

Obviously, many other modifications and variations of the invention, as hereinbefore set forth, may be made without departing from the spirit and scope thereof, and therefore only such limitations should be imposed as are indicated in the appended claims.

We claim:

1. In a furnace, a combustion vessel, means for introducing fuel and combustion promoting gas under pressure into said vessel, means for passing hydrocarbon fluids in indirect heat conducting relation to the interior of said vessel for heating said fluids and for maintaining pressure above 25 pounds per square inch absolute in said vessel, a power mechanism, means for utilizing spent exhaust gases discharged from said vessel for actuating said power mechanism, means for compressing combustion promoting air by said power mechanism, and means for compressing a portion of said spent exhaust gases by said power mechanism and reintroducing same into said vessel for diluting the combustion gases therein.

2. The method of operating a fluid hydrocarbon heater having a radiant heat absorbing section and a convection heat absorbing section comprising introducing fuel and combustion promoting air into the combustion space of said heater near said radiant section and discharging gases therefrom while maintaining the combustion space under pressure of from 25 to 35 pounds per square inch absolute, heating said hydrocarbons by indirect heat transfer from said heated gases, compressing a portion of the heated exhaust gases discharged from said combustion space and reintroducing the same under pressure into said combustion space to control the relative amounts of heat absorbed by said radiant and said convection sections.

3. In a furnace, a combustion vessel, means for introducing fuel and combustion promoting air into said vessel, a radiant heat absorbing section and a convection heat absorbing section in said vessel, means for passing hydrocarbon fluids first through said convection section and then though said radiant section so as to absorb heat indirectly from the interior of said vessel, a power mechanism actuated by a portion of the exhaust gases discharged from said vessel, means operated by said power mechanism for compressing the remaining portion of said exhaust gases and for reintroducing the compressed exhaust gases into said vessel to modify and control the relative heat absorption of said radiant and convection heat absorbing sections.

4. The method of heating fluid hydrocarbons in a furnace comprising igniting fuel and combustion promoting air in the combustion space of the furnace, maintaining said combustion space under pressure of from 25 to 35 pounds per square inch absolute, indirectly heating said hydrocarbons by radiant heat from the ignited fuel in the vicinity of said ignited fuel and by convection heat at a position remote from said ignited fuel while retarding the flow of gases from said combustion space for maintaining positive pressure therein, utilizing a portion of the exhaust gases discharged from the combustion space to compress the remaining portion of the exhaust gases discharged from the combustion space, and reintroducing said compressed exhaust gases into the combustion space to control the relative amounts of the radiant and convection heat absorption.

OSCAR WOLF.
ROSS C. POWELL.